(12) United States Patent
Arnet et al.

(10) Patent No.: US 6,643,149 B2
(45) Date of Patent: Nov. 4, 2003

(54) SWITCHING SYSTEM

(75) Inventors: Beat J. Arnet, Cambridge, MA (US); John P. Deyst, Needham, MA (US)

(73) Assignee: Solectria Corporation, Woburn, MA (US)

( * ) Notice: Subject to any disclaimer, the term of this patent is extended or adjusted under 35 U.S.C. 154(b) by 64 days.

(21) Appl. No.: 09/977,601

(22) Filed: Oct. 15, 2001

(65) Prior Publication Data

US 2002/0044472 A1 Apr. 18, 2002

Related U.S. Application Data

(60) Provisional application No. 60/240,552, filed on Oct. 13, 2000.

(51) Int. Cl.[7] ................................................. H02M 1/12
(52) U.S. Cl. ......................................... 363/41; 363/131
(58) Field of Search ............................ 363/17, 40, 41, 363/131, 132

(56) References Cited

U.S. PATENT DOCUMENTS

| | | | |
|---|---|---|---|
| 5,552,977 A | 9/1996 | Xu et al. ..................... 363/41 |
| 5,717,584 A | 2/1998 | Rajashekara et al. .......... 363/98 |
| 6,005,783 A | * 12/1999 | Xue et al. ..................... 363/36 |
| 6,185,115 B1 | * 2/2001 | Sul et al. ...................... 363/37 |
| 6,313,602 B1 | 11/2001 | Arefeen et al. .............. 318/801 |
| 6,316,895 B1 | 11/2001 | Ramarathnam ............. 318/439 |

OTHER PUBLICATIONS

Van der Broeck, et al. (1986). "Analysis and Realization of a Pulse Width Modulator Based on Voltage Space Vectors." *Conf. Record of the 1986 IEEE Industry Applications Society Annual Meeting* pp. 244–251 (86CH2272–3).

\* cited by examiner

*Primary Examiner*—Adolf Denake Berhane
(74) *Attorney, Agent, or Firm*—Mintz, Levin, Cohn, Ferris, Glovsky and Popeo, P.C.

(57) ABSTRACT

A voltage source inverter generating a poly phase AC signal is provided that includes an SVPWM controller. The controller is adapted to modify the switching pattern at low sine-wave frequencies creating a more even distribution of the conduction losses. The switching pattern periodically changes the sequence (or rotational sense) of the space vector components from clock-wise to counter-clock-wise direction, and vice-versa.

12 Claims, 6 Drawing Sheets

SWITCHING SYSTEM

This application claims priority from Provisional Application Ser. No. 60/240,552, filed Oct. 13, 2000, and assigned to the same assignee.

1. FIELD OF THE INVENTION

The present invention relates to a switching system for generating a sinusoidal signal, and more particularly, to a space-vector pulse width modulation switching technique for generating polyphase AC signals that reduces stress in any given leg during low frequency operation.

2. BACKGROUND OF THE INVENTION

FIG. 1 shows the structure of a three-phase voltage-source inverter (VSI). While the input to the inverter is a DC voltage Vdc, the output consists of the three phases Va, Vb and Vc. The inverter has six power switches (T1–T6), which will be called power switches. The power switches may include anti-parallel diodes, as is understood in the art. By means of these switches each phase can be connected either to the upper or lower DC voltage rail. The power switches are controlled by three binary gate signals (a, b, c) and their complements (a', b', c'). A intentional delay between the conduction of the switches in a leg may be utilized to prevent a short. A pair of power switches associated with a phase is called a "leg". The switches in the leg are selectively coupled to the input DC source in an alternating fashion to generate the AC signal. There are three legs (leg a, leg b, leg c) depicted in FIG. 1, corresponding to a three phase AC signal. FIG. 1A depicts a generic controller that generates the six PWM control signals (a, b, c) and (a', b', c'). The controller may utilize voltage and/or current feedback information to adjust the duty cycle of the PWM signals generated, thereby adjusting power delivered to the load.

Using space-vector representation, it is possible to visualize the three output voltages in a two-dimensional plane, as shown in FIG. 2. The (non-normalized) values of Va, Vb, and Vc are obtained by projecting the space-vector Vs onto the three axes A, B, and C. Creating a three-phased sinusoidal voltage at the output of the VSI is equivalent to a space-vector of fixed length rotating at a certain speed.

Each gate signal pair of the VSI can be put into two states, either high or low, corresponding to either the upper transistor on or the lower transistor on. As there are three transistor pairs, eight possible combinations of on and off states exist which can be represented as space-vectors as shown in FIG. 3. The values in parentheses indicates the gate signals to create the vector; (110) for example stands for a=1, b=1, c=0, while a', b' and c' are the complementary values. Two zero vectors exist (111) and (000), the other six space-vectors form a hexagon. The triangle areas between two fundamental vectors are called sectors.

Using pulse with modulation, an arbitrary space-vector can be composed by time averaging some of the eight fundamental space-vectors of the VSI. This is illustrated in FIG. 4. Space-vector Vs is created as a weighted sum of vector components V1 and V2, by producing principal vectors in sequence for certain times: creating vector component V1, then vector component state V2, then being in zero vector state. The succession of the different vectors results in what is called space-vector pulse width modulation (SVPWM). Each space vector is produced by the controller by a sequence of space vector components formed from the principal space vector axes. The rotation of the space vector itself, which represents the rotation of the desired phases of the controller output, is different from the rotation of the sequence of space vector components during a PWM period that together make up a single given space vector value.

Numerous switching patterns, or sequences of space vector components, can be used to create a certain space-vector. In most cases, two adjacent vectors plus either one or two zero vectors are chosen, in order to minimize the number of transistors switched. FIG. 5 shows two possible PWM patterns to create Vs in FIG. 4. The drawing shows the state of each transistor pair (leg) versus time during one PWM period. It can be observed that both patterns remain in state (100) and (110) during an identical amount of time. In the left pattern, however, the zero vector is split in two halves and composed by (000) and (111). The right pattern, on the other hand, creates the zero vector entirely from (111). As a consequence, the right pattern switches only four times, while the left pattern has to switch 6 times per PWM period. For pattern B, in each sector one leg does not switch at all. The obvious result of this is reduced switching losses.

Unfortunately, pattern B has one major drawback. When a leg is switched from high to low, the current will change path from flowing through the upper power switch to the lower power switch. This is depicted in FIG. 6. At very low sine-wave frequencies, however, the voltage space-vector can reside in the same sector for an extended amount of time. Low frequencies, as set forth herein, means frequencies below the thermal time constant of a switch that makes up the leg. A high time constant corresponds to a low frequency. Consequently, in pattern B, one leg will not switch at all, and one power switch of this leg will have to carry the phase for an extended amount of time. This results in a high thermal stress of the unit.

Space-vector pulse width modulation (SVPWM) has become a popular PWM technique for three-phase voltage-source inverters (VSI) in applications such as alternating-current (AC) motors, residential and commercial power plants, as well as uninterruptible power supplies. SVPWM is a switching technique used to create a three-phased sinusoidal voltage output of variable frequency and amplitude using a six-transistor power-bridge. In contrast to sinusoidal modulation used in traditional inverters, SVPWM allows for higher output voltages for a given input voltage and also reduces the current harmonics. While different SVPWM switching patterns exist, one of them is of particular interest, as it reduces the switching losses by approximately 33%. Unfortunately, this pattern does not distribute the conduction losses evenly over one PWM period. At very low sine-wave frequencies, one transistor will end up conducting significantly longer than the other five. Consequently, this switch will experience the highest thermal stress and the maximum phase current will have to be reduced in order to prevent the transistor from overheating. The consequence is reduced current capability of the inverter at low sine-wave frequencies, and a deterioration of the performance of the inverter system.

SUMMARY OF THE INVENTION

Conventional VSIs operate with one fixed switching pattern. The present invention is a modification of the switching pattern at low sine-wave frequencies creating a more even distribution of the conduction losses. The switching pattern periodically changes the sequence of the space-vector components from clock-wise to counter-clock-wise and vice-versa. This scheme reduces the worst-case conduction losses by up to 50%, while the switching losses will only increase minimally (on the order of 1%). In an AC motor control application, the increase in stall torque can approach 100%.

In one aspect, the present invention provides a voltage source inverter system, comprising a DC voltage source and a plurality of power switches arranged in pairs, each switch in each pair periodically coupled to said DC voltage source, each pair constituting a leg, and each leg generating a different phase AC signal. The AC signal represented by a sequence of vector components that form a space vector rotating through a set of axes represented by each said phase. A controller is provided to generate a plurality of PWM signals controlling the conduction states of said switches to periodically couple one or the other of said pair of switches to said DC voltage source. The controller is adapted to periodically switch the rotational sense of the space vector components from a clockwise direction to a counter-clockwise direction.

In another aspect, the present invention provides a space vector pulse width modulation system comprising a controller that generates a plurality of PWM signals controlling the conduction states of a plurality of switches to generate a polyphase AC signal. The switches generating an AC signal represented by a sequence of vector components which form a space vector rotating through a set of axes represented by each phase of the AC signal. The controller has a first operating mode that controls the switches to generate a space vector that rotates in one direction if the frequency of the space vector is above a predetermined value, and a second operating mode that that controls the switches to generate a space vector that changes rotation from clockwise to counter-clockwise if the frequency of the space vector is below a predetermined value.

In another aspect, the present invention provides space vector pulse width modulation system, comprising a controller generating a plurality of PWM signals controlling the conduction states of a plurality of switches to generate a polyphase AC signal. The switches generate an AC signal represented by a sequence of vector components which form a space vector rotating through a set of axes represented by each phase of the AC signal. The controller has a first operating mode that controls the switches to cause the components of the space vector to rotate in one direction if the frequency of the space vector is above a predetermined value, and a second operating mode that controls the switches to cause the components of the space vector to rotate from clockwise to counter-clockwise (and/or vice versa) if the frequency of the space vector is below a predetermined value.

In specific exemplary embodiments, the controller is adapted to periodically switch the rotational sense of said space vector from a clockwise direction to a counter-clockwise direction as a function of the thermal time constant of at least one of said switches controlled by the controller.

It will be appreciated by those skilled in the art that although the following Detailed Description will proceed with reference being made to preferred embodiments, the present invention is not intended to be limited to these preferred embodiments. Other features and advantages of the present invention will become apparent as the following Detailed Description proceeds, and upon reference to the Drawings, wherein like numerals depict like parts, and wherein:

DETAILED DESCRIPTION OF EXEMPLARY EMBODIMENTS

Figure 1:
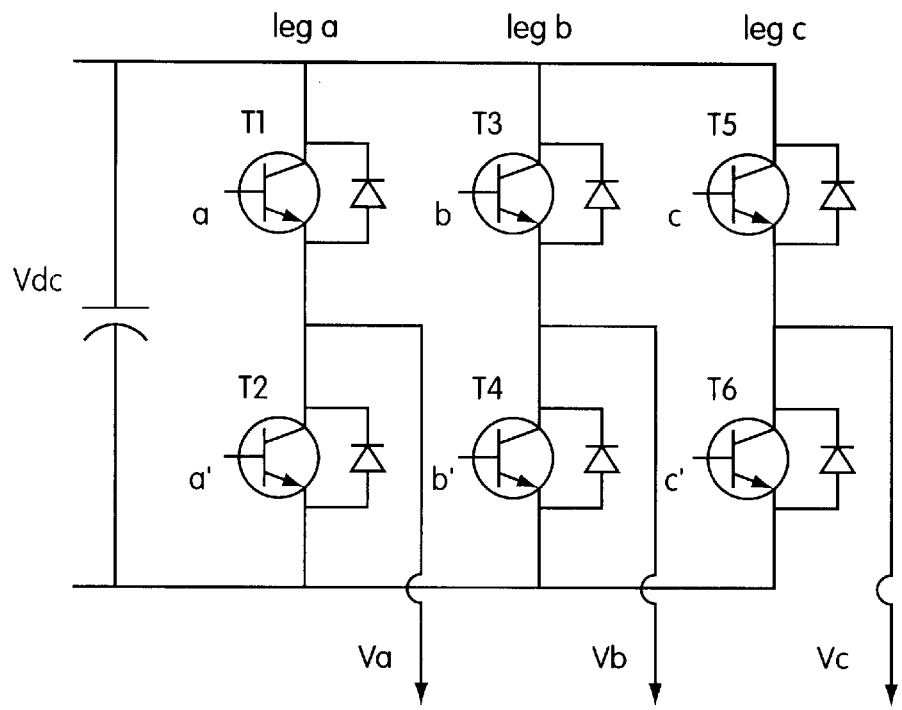
FIG. 1 is circuit diagram of a conventional three-phase voltage-source inverter (VSI)
Figure 1A:
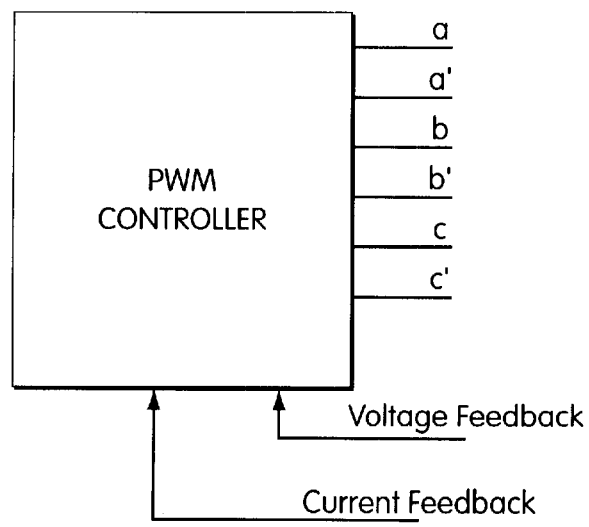
FIG. 1A is a generic PWM controller to control the conduction states of the switches of FIG. 1.
Figure 2:
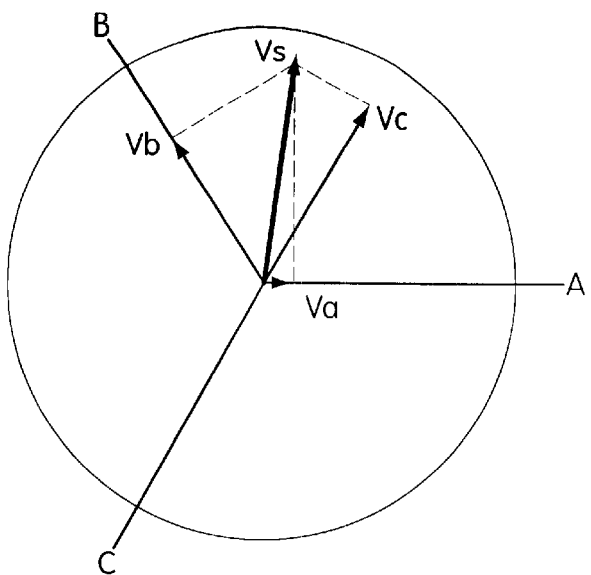
FIG. 2 is a space-vector representation of the output voltages of the circuit of FIG. 1.
Figure 3:
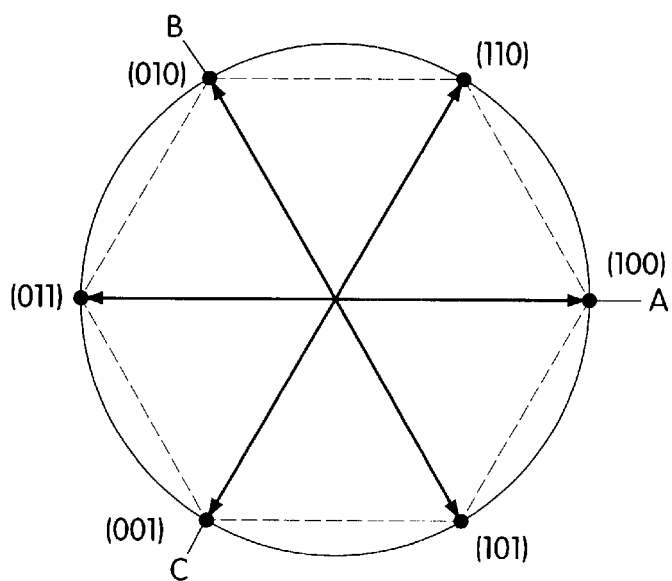
FIG. 3 is the space vector combinations of the states of the circuit of FIG. 1.
Figure 4:
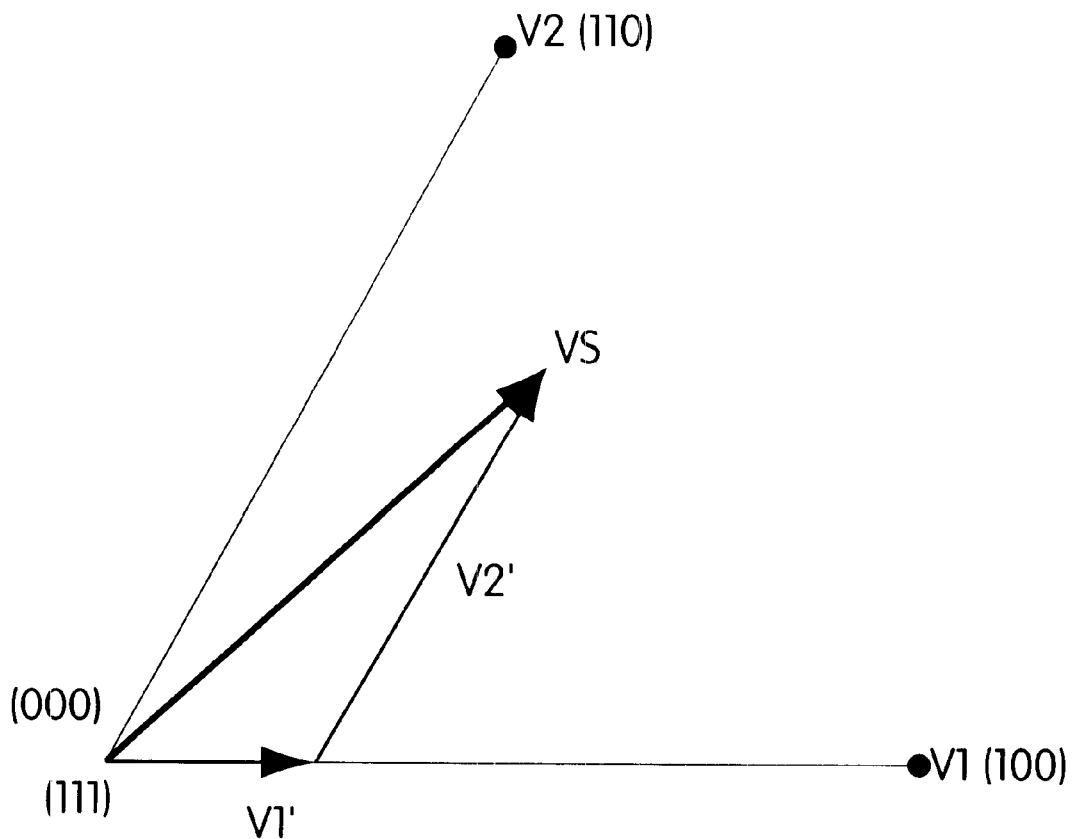
FIG. 4 is a space vector representation depicting an averaging of an arbitrary space vector $V_s$ using pulse width modulation.
Figure 5A:
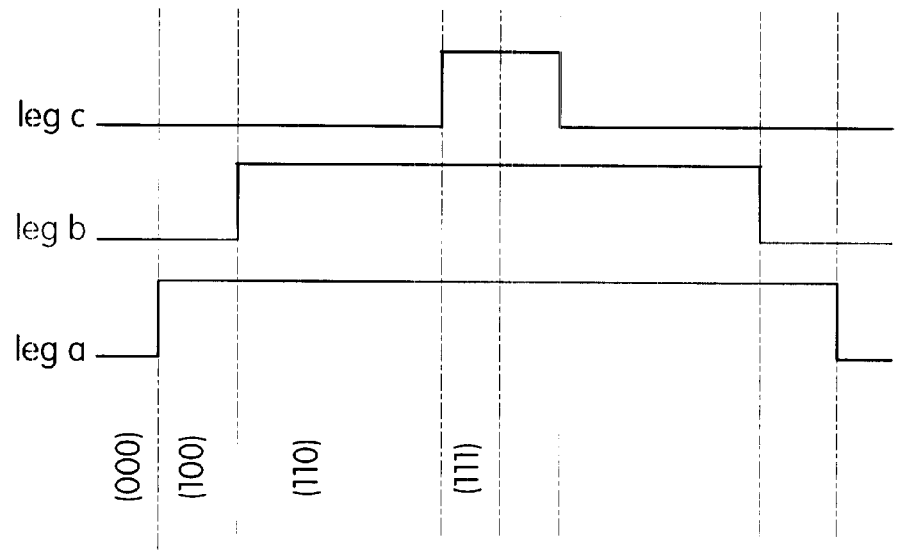
FIG. 5 depicts two PWM patterns creating $V_s$ of FIG. 4.
Figure 5B:
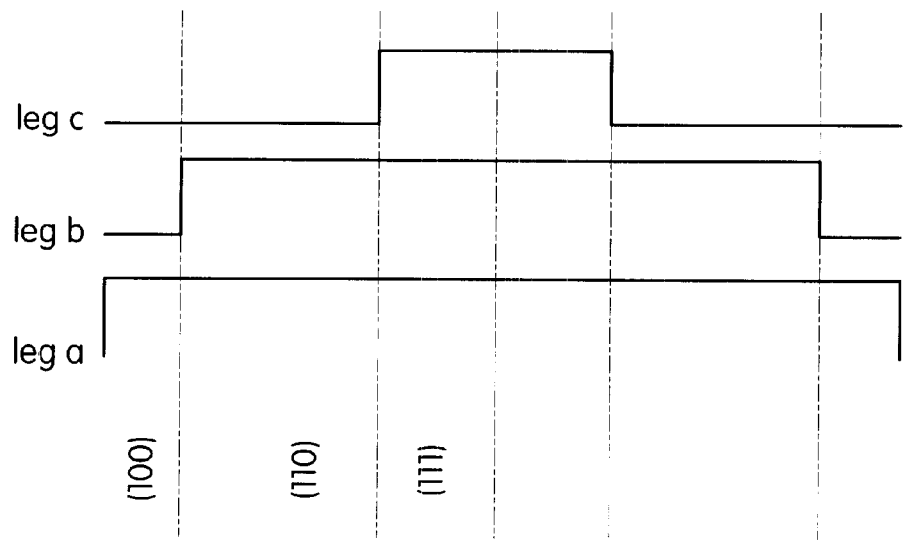
Figure 6:
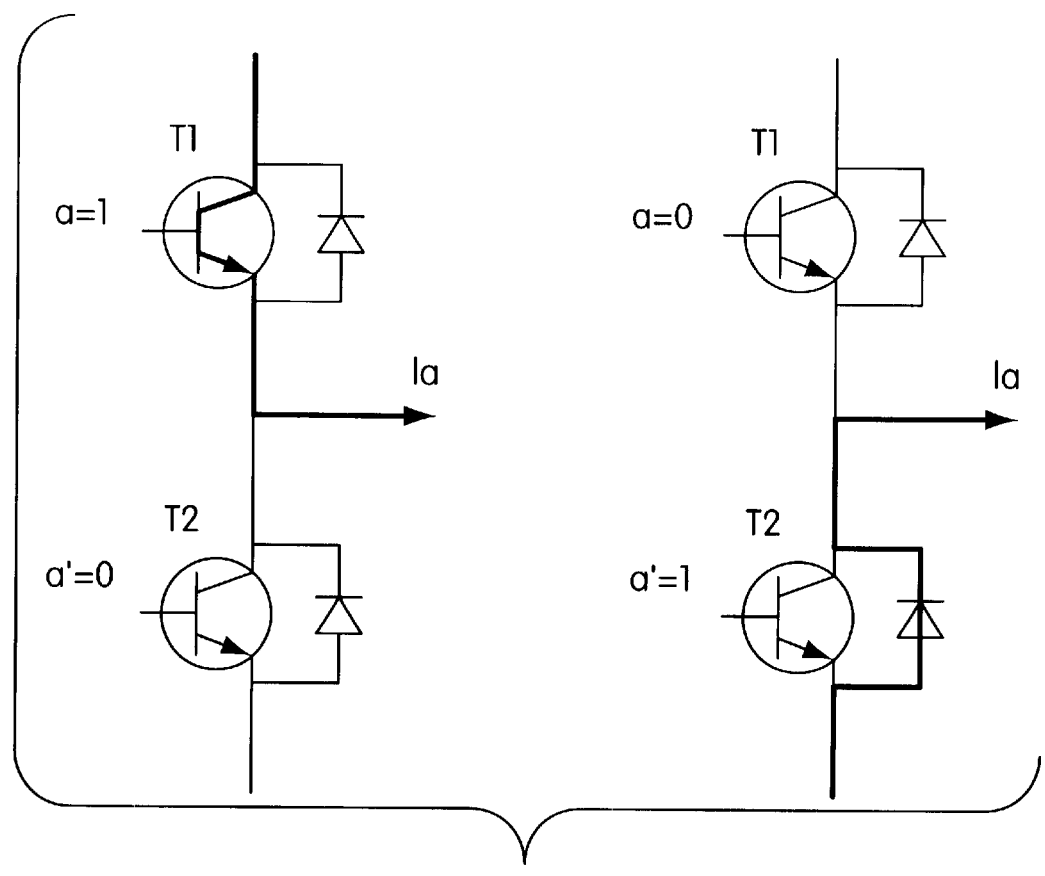
FIG. 6 depicts exemplary switching patterns of the circuit of FIG. 1.
Figure 7A:
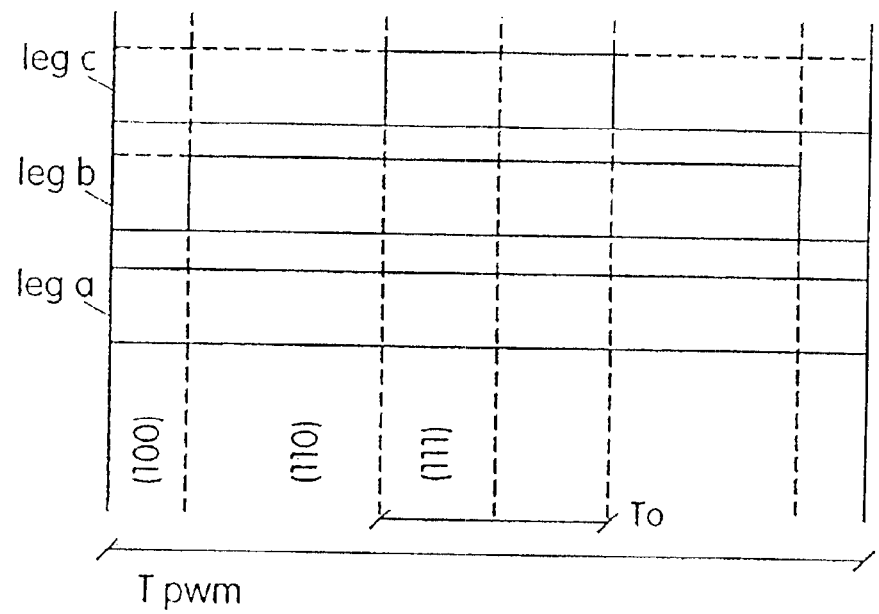
FIGS. 7A and B depicts exemplary PWM patterns according to the present invention.
Figure 7B:
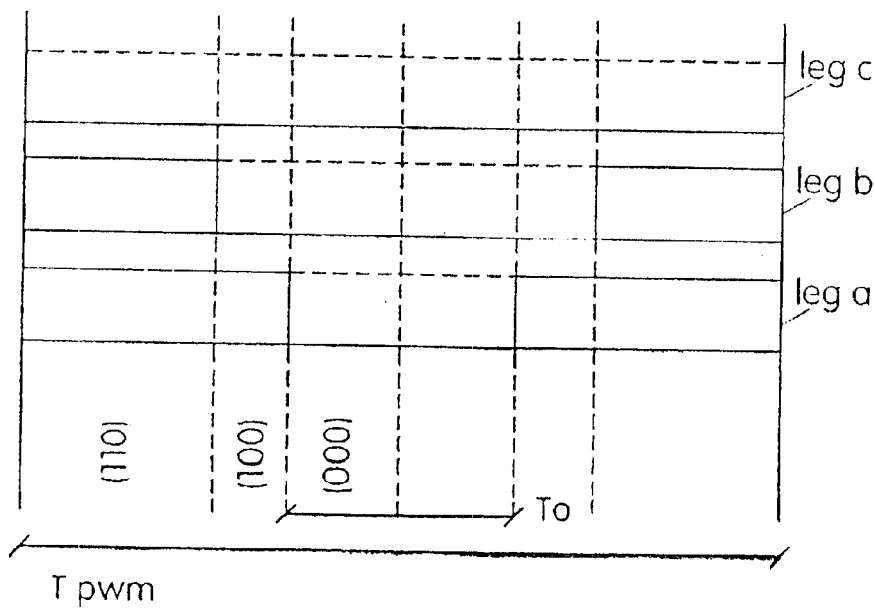

It is assumed herein that a generic PWM controller (as shown in FIG. 1A) is operating the switches depicted in FIG. 1. PWM controllers are well-understood in the art, and all such controllers are deemed within the scope of the present invention. This controller is modified by the present invention to generate the switching pattern described below. Switching pattern B of FIG. 5 offers an additional degree of freedom. As shown in FIG. 7, the sequence of the two non-zero vectors components can be permutated. On the left pattern in the FIG. 7, vector component (100) is followed by vector component (110). This is a counter-clock-wise sequence, according to the hexagon in FIG. 3. The other possibility consists in starting with vector component (110) and then switching clockwise to component (001), as shown on the second half of FIG. 7. The two directions of component sequence rotation result in different zero-vectors ((000) versus (111)) being used as components, and also in a different leg not being switched. In B-CCW it is leg A that remains unchanged through the entire sector, in B-CW it is leg C. This fact is being exploited in the present invention. If the sense of rotation of the components of the space vector is periodically switched from CCW to CW, the conduction losses will be distributed more evenly among the different power switches. Accordingly, the controller that controls the conduction states of the switches is adapted to periodically switch the rotational sense the components of the space vector from a clockwise (CW) direction, to a counter-clockwise (CCW) direction, and vice versa. The switching frequency between CCW to CW may be fixed as a function of the thermal time constant of the switches. Alternatively, the switching frequency may be random or dynamic. For maximum benefit, the frequency of change of the rotational sense of the component sequence should be much higher than the reciprocal of the thermal time constant of the switches, but the present invention is not limited by this rotational sense switching frequency.

The duty cycle δ (of the PWM signal generated by the controller to control the conduction state of the switches) is defined as the percentage of time the VSI is not in a zero state:

$$\delta = 1 - (T_0/T_{PWM}) \qquad \text{EQ. 1}$$

In B-CCW the power switch T1 is conducting 100% of the time, whereas in B-CW the relative conduction time is reduced to the duty cycle δ. If the direction of rotation is changed periodically, T1 will have an average relative conduction time of:

$$\delta_{T1}=0.5+(\delta/2) \qquad \text{EQ. 2}$$

The same is true for the power switch T6 of leg C. If the heating of the power switch is proportional to the current, as is the case with IGBTs, the present invention allows the current to be increased by a factor:

$$I^*=(2/(1+\delta)) \qquad \text{EQ. 3}$$

In the case of the MOSFETs, which exhibit losses proportional to the square of the current, this factor may be even higher.

Equations (2–3) show that the effectiveness of the present invention depends on the duty cycle δ. For very small duty cycles (e.g., below 5%) the on-time of certain power switches can be reduced by almost 50%. If the VSI is used to power an electric motor, δ is given by the efficiency of the motor as well as the motor speed. At very low motor speeds (sinewave frequencies), δ is essentially proportional to the motor losses. At these low speeds, typical values for traction motors range from δ=0.05 to 0.03.

If the torque of the motor is assumed to be proportional to the motor current, the gain of stall torque T* would be proportional to I*, i.e., $$T^*=(2/(1+\delta)) \qquad \text{EQ. 4}$$

Assuming δ=0.3, the proposed method would result in a stall torque gain of over 50%.

Best Mode Implementation

The proposed invention has been realized and tested using a Solectria motor controller (Part No. DMOC 445) with a Texas Instruments (TI) digital signal processor (DSP) (also not shown, for example using TIDSP No. TMS 320 F240). This DSP offers a PWM module with selectable SVPWM rotation sense. If the frequency of rotation of the space vector is below a certain value, $f_{therm}$ (corresponding to the thermal time constant of the switch), then the controller begins switching the rotational sense of the space vector component sequence, with frequency $f_{rs}$. $F_{therm}$ may be set, for example, at an order of magnitude smaller than the reciprocal of the thermal time constant of the power switch.

In the test, $f_{therm}$, was equal to 10 $H_z$, while $f_{rs}$ was set at 100 $H_z$. $F_{rs}$ represents the frequency of switching the rotational sense. With a PWM frequency of 10 KHz, a periodical change of direction of rotation at 100 $H_z$ has a negligible effect on the switching losses. However, with a conservative estimate of δ=30% at low speeds, a torque gain of over 50% could be achieved.

Accordingly, the controller has a first operating mode that controls the switches to cause the components of the space vector to rotate in one direction if the frequency of the space vector is above a predetermined value. The controller also has a second operating mode that controls the switches to cause the components of the space vector to rotate from clockwise to counter-clockwise (and vise versa) if the frequency of the space vector is below a predetermined value. The predetermined value may be, as set forth above, a function of the thermal time constant of the switch.

The present invention increases the stall torque of electric drive applications. The modified switching pattern is compatible with existing PWM modulation hardware (e.g., motion control microprocessors and DSPs), thus implementation of the present invention does not require sophisticated hardware or software, or valuable calculation time. The present invention is equally applicable in synchronous and asynchronous AC motor controllers for use in, e.g., electric traction and industrial drive applications.

Those skilled in the art will recognize numerous modifications to the present invention, and all such modifications are deemed within the scope of the present invention, only as limited by the claims.

What is claimed is:

1. A voltage source inverter system, comprising:
   a DC voltage source;
   a plurality of power switches arranged in pairs, each switch in each pair periodically coupled to said DC voltage source, each pair constituting a leg, and each leg generating a different phase AC signal, said AC signal represented by a sequence of vector components which form a space vector rotating through a set of axes represented by each said phase; and
   a controller generating a plurality of PWM signals controlling the conduction states of said switches to periodically couple one or the other of said pair of switches to said DC voltage source, said controller being adapted to periodically switch the rotational sense of said vector components from a clockwise direction to a counter-clockwise direction, and vice-versa.

2. A system as claimed in claim 1, wherein said plurality of switches comprising six switches, each leg comprising two switches, and each leg generating a component of a three-phase AC signal.

3. A system as claimed in claim 1, wherein said controller adapted to periodically switch the rotational sense of said vector components from a clockwise direction to a counter-clockwise direction as a function of the thermal time constant of at least one of said switches in one of said legs.

4. A system as claimed in claim 1, wherein if the frequency of the space vector is below a certain value corresponding to the thermal time constant of the switch, then the controller begins switching the rotational sense of the vector components of said space vector.

5. A system as claimed in claim 1, wherein said controller has a first operating mode that controls the switches to cause the components of the space vector to rotate in one direction if the frequency of the space vector is above a predetermined value, and a second operating mode that controls the switches to cause the components of the space vector to rotate from clockwise to counter-clockwise, and vice versa, if the frequency of the space vector is below a predetermined value.

6. A space vector pulse width modulation system, comprising a controller generating a plurality of PWM signals controlling the conduction states of a plurality of switches to generate a polyphase AC signal, said switches generating an AC signal represented by a sequence of vector components which form a space vector rotating through a set of axes represented by each said phase, said controller being adapted to periodically switch the rotational sense of said vector components of said space vector from a clockwise direction to a counter-clockwise direction, and vice versa.

7. A space vector pulse width modulation system, comprising a controller generating a plurality of PWM signals controlling the conduction states of a plurality of switches to generate a polyphase AC signal, said switches generating an AC signal represented by a sequence of vector components which form a space vector rotating through a set of axes represented by each phase of said AC signal; said controller has a first operating mode that controls the switches to cause the components of the space vector to rotate in one direction if the frequency of the space vector is above a predetermined value, and a second operating mode that controls the switches to cause the components of the space vector to rotate from clockwise to counter-clockwise if the frequency of the space vector is below a predetermined value.

8. A system as claimed in claim 7, wherein said predetermined value is a function of the thermal time constant of at least one of said switches.

9. A voltage source inverter system, comprising:

a DC voltage source;

six switches arranged in pairs, each switch in each pair periodically coupled to said DC voltage source, each pair constituting a leg, and each leg generating a different phase of a three-phase AC signal, said AC signal represented by a sequence of vector components which form a space vector rotating through a set of axes represented by each said phase; and a controller generating a plurality of PWM signals controlling the conduction states of said switches to periodically couple one or the other of said pair of switches to said DC voltage source, said controller being adapted to periodically switch the rotational sense of said vector components from a clockwise direction to a counter-clockwise direction.

10. A system as claimed in claim 9, wherein said controller adapted to periodically switch the rotational sense of said vector components from a clockwise direction to a counter-clockwise direction as a function of the thermal time constant of at least one of said switches in one of said legs.

11. A system as claimed in claim 9, wherein if the frequency of the space vector is below a certain value corresponding to the thermal time constant of the switch, then the controller begins switching the rotational sense of the vector components of said space vector.

12. A system as claimed in claim 9, wherein said controller has a first operating mode that controls the switches to cause the components of the space vector to rotate in one direction if the frequency of the space vector is above a predetermined value, and a second operating mode that controls the switches to cause the components of the space vector to rotate from clockwise to counter-clockwise if the frequency of the space vector is below a predetermined value.

* * * * *